Aug. 8, 1967 R. G. BOURDEAU 3,334,967
PROCESS OF PREPARING BORON CARBIDE FROM
BORON HALIDE AND A HYDROCARBON
Filed Sept. 9, 1965
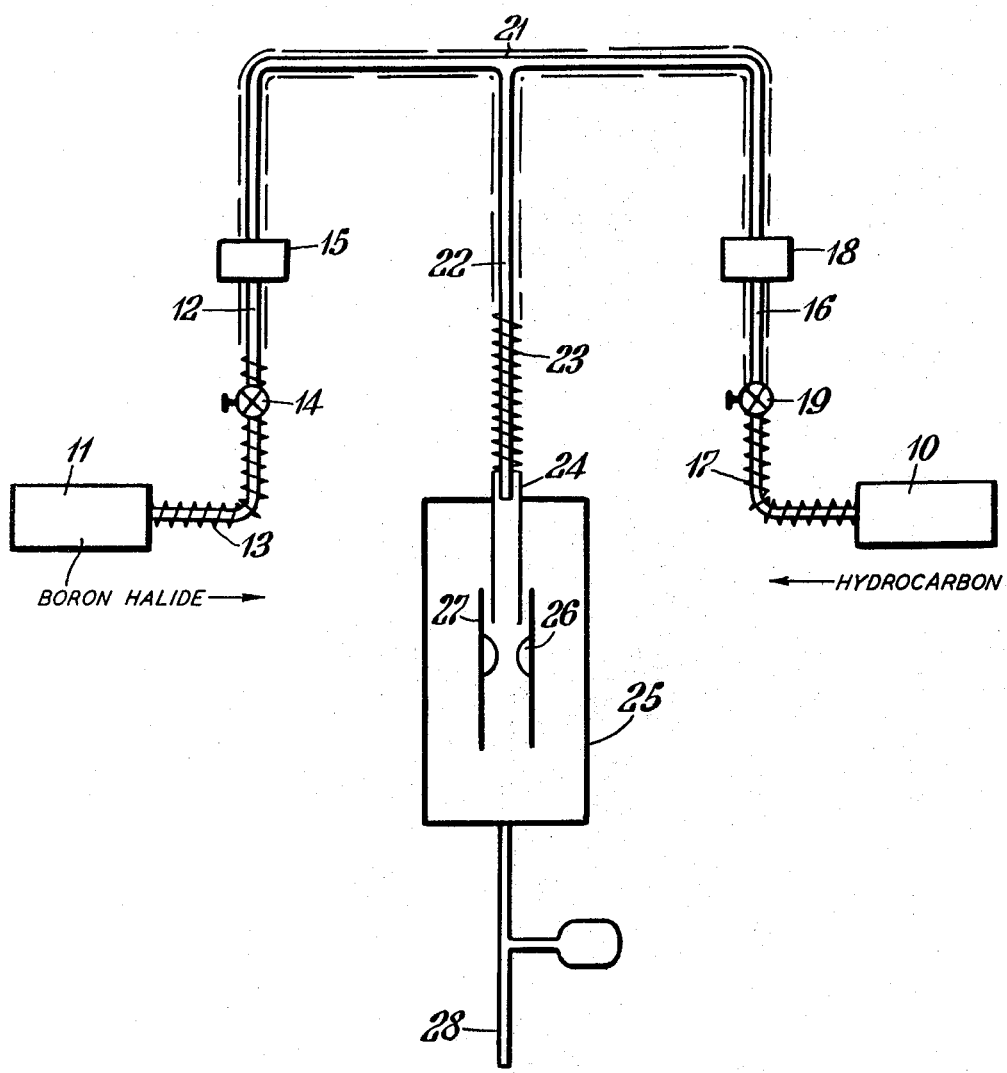
INVENTOR.
ROMEO G. BOURDEAU
BY
ATTORNEY

3,334,967
PROCESS OF PREPARING BORON CARBIDE FROM BORON HALIDE AND A HYDROCARBON
Romeo G. Bourdeau, Brookline, Mass., assignor to Union Carbide Corporation, a corporation of New York
Filed Sept. 9, 1965, Ser. No. 486,184
2 Claims. (Cl. 23—208)

This application is a continuation-in-part of Ser. No. 172,972, filed Feb. 13, 1962, now forfeited.

This invention relates to boron carbide and particularly to an improved process for use in producing boron carbide.

One of the hardest materials known to man are diamonds but the utility of natural diamond is somewhat limited because of its expense. In recent years industry has attempted to overcome this drawback by devising several methods which may be used to simulate nature resulting in the production of artificial diamonds. On a comparative basis, artificial diamonds are less expensive but the methods which are used to produce them are quite complicated because they require elaborate pressure and temperature schedules.

An object of this invention is in improved material having a hardness approaching that of diamonds.

A further object of this invention is a simple and economical process which may be used to produce a material having a hardness approaching that of diamonds.

Other and further objects of this invention will be obvious upon an understanding of the lliustrative embodiment about to be described, or will be indicated in the appended claims, and various advantages not referred to herein will occur to one skilled in the art upon employment of the invention in practice.

We have discovered that boron carbide may be produced in a form such that it possesses a hardness approaching that of natural diamonds. This is accomplished under certain conditions by the gaseous reaction of a halide of boron in the vapor phase with the vapors of a hydrocarbon, such as, for example, methane. This reaction may be illustrated by the following equation:

$$4B\ Halide_3 + CH_4 \rightarrow B_4C + 4H\ Halide + 4Cl_2$$

In general, the reactants are brought together in stoichiometric proportions, but the molar ratios expressed in the foregoing equation may be varied within limits hereinafter defined. The reaction temperature employed lies within a range from about 1500° C. to about 2500° C. The reaction is carried out at subatmospheric pressure, preferably within a pressure range of about 0.1 mm. to about 200 mm. of mercury.

The halides of boron which are suitable as starting materials for the preparation of boron carbide in accordance with the invention include the chloride, bromide, fluoride and iodide, but because of its ready availability and cost, boron trichloride is preferred.

In general, this process utilizes a vapor-phase technique in which boron carbide is deposited onto a heated surface by the thermal decomposition and interreaction of boron halide and a hydrocarbon gas. The various techniques utilized in this process are described in detail as follows:

The figure is a diagrammatic view of the apparatus within which the present process may be carried out.

The system as shown in the figure consists of a conventional vapor plating furnace 25 having a central feed line 22 and an exhaust line 28. The external end of the central feed line 22 communicates with two separate feed lines 12 and 16. The first feed line 12 is provided with a boron trichloride generator 11, while the second feed line 16 is provided with a cylinder 10 which houses a gaseous hydrocarbon supply.

In general, the boron halide is rendered gaseous by means of a heated generator 11 prior to entering the feed line 12. The halide will then be maintained in the gaseous state while travelling through the feed line 12 because the feed line 12 is adapted with an external heating means 13. In any case, the halide in the feed line 12 will be maintained at a temperature between 100° C. and 300° C. The rate of flow of the gaseous halide travelling through the feed line 12 is controlled by means of a valve 14. The rate of flow of the boron halide vapors may be set within the range of 0.1 liter per minute to 10 liters per minute as indicated by a metering gauge 15. Simultaneously, a gaseous hydrocarbon such as methane, ethane, propane or benzene is introduced into a second feed line 16 which is also adapted with a suitable heating means. The temperature of the hydrocarbon gas travelling through the second feed line 16 is maintained within the temperature range of 100° C. to 300° C. The rate of flow of the hydrocarbon gas may be between 0.1 liter per minute to 10 liters per minute depending on the rate of flow of the gaseous boron halide with which it is to be reacted. In any event, rate of flow of the reactant gases should be such as to provide a carbon to boron molar ratio of 0.1 to 20; the preferred ratio being 2. The rate of flow of the gaseous hydrocarbon is indicated by means of a measuring gauge 18 and controlled by means of a valve 19. The two gases travelling through their separate feed lines meet at junction 21 and are directed through a central feed line 22 which is also adapated with a suitable heating means 23. The gases are substantially mixed in their travel through the central feed line 22 and are introduced in this state to an injector 24, as previously stated, the molar ratio of carbon to boron being 0.1 to 20. The injector 24, when suitably mounted, will fit into the conventional furnace 25 commonly used for vapor phase depositions as shown in the figure. The reactants pass through the injector to the hottest point of the furnace, at which point they react with each other producing a boron carbide which will deposit itself on any surface that is present. A suitable substrate 26 should be mounted in the deposition tube if it is desired to produce a coating by this process. However, if it is desired to produce the boron carbide as a powder, a substrate should not be mounted in the deposition tube. In this case, the vaporous reactants are introduced into the deposition zone of the furnace at which time the boron carbide will deposit itself on the walls of the deposition tube 27. After a suitable time, the system may be shut down and the boron carbide may be removed from the walls in the form of a powder.

The hydrocarbons which may be used in this process include those which are gaseous at ordinary temperatures, as well as hydrocarbons which are liquid or even solid at ordinary temperatures but capable of being vaporized at temperatures up to about 300° C., and which are capable of pyrolysis to yield carbon at a suitable decomposition temperature. Suitable hydrocarbons include both acyclic and cyclic types, and may be either saturated or unsaturated. Examples of acyclic hydrocarbons which may be employed for this purpose include methane, ethane, propane, butane, ethylene, propylene, and butylene, while examples of cyclic hydrocarbons include benzene, toluene and cyclohexane.

The present process is operative within the temperature range of about 1500° C. to 2500° C. If the process is carried out at a temperature below 1500° C., the deposition rate will be exceedingly small and the process will be impractical for commercial purposes. The deposition rate should be maintained at about 30 mils per hour. It would also be impractical to operate the process above 2500° C. because the end-product, i.e. the boron carbide, will substantially decompose above this temperature. As heretofore described, this process may be utilized to produce a coating or a powder depending on the particular technique utilized. However, the process is highly effective within the temperature range of 1800° C. to 2200° C. but preferably the temperature of the process is 1900° C. because of this temperature a product of high strength and high density is produced. Whenever the expression "deposition temperature" is used in the specification or claims, it is intended to mean the temperature at which the gases will decompose and react with each other to effect a deposit of boron carbide upon a suitable surface.

The pressure of the process is inter-related with temperature which has been discussed above. This process is operative within the pressure range of 0.1 mm. to 200 mm. of mercury. The specific pressure utilized within this range will depend on the product desired, i.e., whether the boron carbide is to be a coating or a powder. If it is desired to produce a coating, the pressure should be ever, if the pressure is allowed to increase above 200 mm. mercury. A variation in pressure will somewhat affect the deposition rate of the coating. If the pressure of the coating process is maintained around 0.1 mm. of mercury, the rate of deposition of the coating will be low. However, if the pressure is allowed to increase about 200 mm. of mercury, the deposit will consist primarily of soot. In any case, as the pressure is increased, the reaction rate will increase until a limiting pressure is reached and soot begins to form. If it is desired to produce a boron carbide of extraordinary hardness, the pressure should be within the range of 1 mm. and 20 mm. of mercury, and preferably around 5 mm. of mercury. In any case, the process will operatively produce a boron carbide of superior hardness if the pressure is between 0.1 mm. and 200 mm. of mercury.

The following example will illustrate the process.

The temperature of the furnace was brought to 1900° C. and the pressure was maintained at 5 mm. of mercury. The reactants, i.e. boron trichloride and methane, were then introduced in the deposition zone of the furnace. The flow rate of boron trichloride was established at approximately 1 liter per minute, while the flow rate of methane was established at 2 liters per minute. The overall deposition rate was calculated to be approximately 0.015 inch per hour. After a suitable time, the temperature and pressure were allowed to return to normal and the product was removed from the furnace.

A boron carbide of superior hardness was obtained from the procedure set forth in the above example. The product was in the form of crystals having a hardness approaching that of diamond. The hardness of the product expressed as a Knoop Hardness Number is set forth in Table I wherein it is compared with the hardness of other materials.

TABLE I

|  | 100 gram load | 50 gram load |
|---|---|---|
| Diamond | 7,000 | 8,000 |
| Product | 6,300 | 7,371 |
| Boron Carbide* | 2,750 | 3,700 |
| Silicon Carbide | 2,480 | 3,500 |

*Ordinary commercial boron carbide.

Table I indicates that boron carbide which is produced from the procedure set forth in the example is quite superior in hardness to boron carbide which is commercially produced by conventional processes. It can also be seen that boron carbide produced by this procedure has a hardness approaching that of diamonds. This carbide may replace diamonds in a number of applications, for instance as a polishing agent or for use in grinding wheels, cutting tools, drills, polishing laps and tables. In fact, in some applications, this carbide would be superior to diamonds because the metallic carbide will not break down at high temperatures as an ordinary diamond would. The boron carbide produced by the present process is much cheaper than ordinary diamonds and can be produced in the crystalline form, the powder form, or as a thick layer for use as a coating on ductile base material. It is also possible to form brazes and to cement the boron carbide in a suitable matrix. This is not possible with diamonds and they can only be mechanically locked-in when used for such things as grinding wheels. It is also important to note that the oxidation resistance of boron carbide as produced by the present process is greater than that of diamonds.

There are many advantages inherent in the present process other than those heretofore set forth. These are all intended to be covered by the scope of this invention. As various changes may be made in the form, apparatus, and conditions of the process herein described without departing from the spirit and scope of the invention, it is to be understood that all matter herein is to be interpreted as illustrative and not in a limiting sense.

What is claimed is:

1. The process of producing a boron carbide of superior hardness which comprises reacting a halide of boron in the vapor phase with a hydrocarbon in the vapor phase at a temperature between about 1500° C. and about 2500° C. at a pressure between about 0.1 mm. and about 200 mm. of mercury, the ratio of hydrocarbon vapor to halide vapor being such as to provide a carbon to boron molar ratio of 0.1 to 20.

2. A process of producing a boron carbide of superior hardness which comprises reacting boron trichloride vapor with methane gas at a temperature of about 1900° C. and a pressure of about 5 mm. of mercury, and recovering the boron carbide thus fromed, the ratio of methane gas to boron trichloride vapor being such as to provide a carbon to boron molar ratio of 0.1 to 20.

References Cited

UNITED STATES PATENTS

| 1,019,393 | 5/1912 | Weintraub | 23—208 X |
| 3,011,912 | 5/1961 | Gareis | 23—208 X |
| 3,099,523 | 7/1963 | Reuschel et al. | 23—208 X |

FOREIGN PATENTS 778,267   7/1957   Great Britain.

OTHER REFERENCES

Campbell et al.: article in Transaction of the Electrochemical Society, vol. 96, p. 325 (1949).

Ridgeway: article in Transaction of the Electrochemical Society, vol. 66, p. 293–97 (1934).

OSCAR R. VERTIZ, *Primary Examiner.*

G. T. OZAKI, *Assistant Examiner.*